Feb. 7, 1961 S. L. BENDELL 2,971,116

TELEVISION CAMERA SYSTEM

Filed Nov. 4, 1957 2 Sheets-Sheet 1

INVENTOR.
SIDNEY L. BENDELL
BY
W. H. Sprague
ATTORNEY

INVENTOR.
SIDNEY L. BENDELL
BY
[signature]
ATTORNEY 2,971,116

TELEVISION CAMERA SYSTEM

Sidney L. Bendell, Haddon Heights, N.J., assignor to Radio Corporation of America, a corporation of Delaware Filed Nov. 4, 1957, Ser. No. 694,214
5 Claims. (Cl. 315—10)

This invention relates to improvements in television image transmission, and more particularly to improvements in apparatus associated with television camera tubes, or the like.

The image orthicon television camera pickup tube has been widely accepted as a desirable means for translating light images into electrical signals suitable for television transmission. A good description and explanation of the operation of an image orthicon may be found in an article entitled "The Image Orthicon—A Sensitive Television Pickup Tube," by Albert Rose, Paul K. Weimer, and Harold B. Law, appearing in the July 1946 issue of the Proceedings of the Institute of Radio Engineers.

Broadcast experience with image orthicon tubes has shown that in most cases a tube is retired because it develops a tendency to "stick" or "burn." That is, if a camera is held stationary on a scene for a few seconds, a well defined negative image will persist after the camera is "panned" away. The magnitude of this effect increases with the number of hours of actual tube operation and although not permanent, the tube is not satisfactory for broadcast use when the exposure time required to cause the burn becomes enough to equal the duration of a normal stationary scene encountered in ordinary programming.

In practice the effects of the burn may be reduced by producing movement of the electron image on the target screen of the image orthicon tube. One method for providing this movement is controlling the current in one or more coils positioned adjacent the image section of the tube to establish a varying magnetic field for displacing the electrons which travel between the photocathode and the target electrode.

In spite of the fact that the motion of the electron image on the target electrode may be very small, there are cases where it would be objectionable, especially when cameras are used for superpositions and other effects commonly encountered in television broadcast practice.

Accordingly, it is an object of this invention to provide an improved television camera system wherein movement of the electron image on the target electrode to prevent "burning" or "sticking" does not effect the output signal from the camera.

Another object of this invention is to provide a simplified television camera system of the type wherein the electron image on the target electrode of an image orthicon camera tube is cyclically displaced by a variable magnetic field to prevent "burning" or "sticking" in which the output signal from the camera as reproduced on a television receiver appears to be stationary.

According to the present invention, one or more coils are placed adjacent the image section of the image orthicon. A variable current from a suitable source is passed through the coil or coils to provide a moving magnetic field for displacing the electron image at the target of the image orthicon. Corresponding coils are placed adjacent the scanning section of the image orthicon between the target electrode and the electron gun. A variable current is passed through the corresponding coils to provide a variable magnetic field for displacing the scanning raster at the target of the image orthicon in a complementary manner, so that the scanning raster is always in the same position relative to the electron image on the target electrode. The movement of the scanning raster can be exactly synchronized with the movement of the electron image by connecting the image section coils in series or in parallel with the same power source. In this manner, the resulting signal appearing at the output electrode of the image orthicon is not effected by movement of the electron image on the target electrode.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
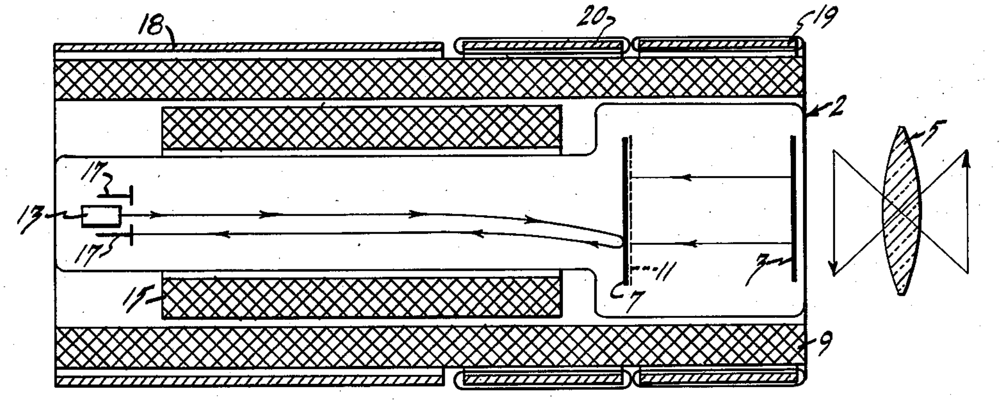
Figure 1 is a diagrammatic sectional view on a reduced scale of an image orthicon camera tube with associated deflection and focusing coils, and including an illustrative embodiment of the present invention.

Referring now to the drawings wherein like reference characters are used to designate similar components in the various figures thereof, and particularly to Figure 1, a simplified sectional view of an image orthicon tube 2 is shown. An image to be televised may be focused on the photocathode 3 by means of a lens 5. Photoelectrons emitted as a result of the impression of an image on the photocathode 3 are accelerated from the photocathode 3 towards the target 7 by an electric field produced by suitable potentials being applied to the photocathode 3 and the target 7, and a magnetic field produced by a focusing coil 9 focuses this electron image on the target 7. Secondary electrons occurring as a result of the photoelectrons striking the target 7 are collected by a target screen 11. This leaves a charged pattern on the target 7 corresponding to the original light image focused on the photocathode 3. That portion of the image orthicon camera tube including the photocathode, target, and target screen, is commonly known as the image section.

A stream of electrons from the cathode 13 is focused on the target 7 by a magnetic field produced by the focusing coil 9 and may be deflected across the target 7 to scan the surface thereof by the deflection coil 15. When the electron beam from the cathode 13 strikes a portion of the target 7 where there is no positive charge, substantially all of the electrons are reflected and returned toward the gun approximately along the initial path. However, if there is a positive charge pattern on the target, the electrons are deposited in sufficient numbers to neutralize the positive charge and the remaining electrons are reflected back toward the cathode 13 and collector electrode 17. In this way, a stream of electrons amplitude-modulated by the charge pattern is returned to a collector electrode 17. Additional information on the operation of the image orthicon may be found in "The Image Orthicon—A Sensitive Television Pickup Tube," supra.

It has been found, that when a camera is held stationary on a scene, particularly a high contrast scene, a well defined negative image will persist after the camera is panned away. When viewing the result of this effect on a television monitor or on a home television receiver, the outline of images appearing during the quiescent interval will be seen to remain even when the camera is directed toward another scene.

The "burn" appears to reside in the thin glass target of the image orthicon tube, but the exact mechanism of its formation is not completely understood. After many hours of continuous high velocity bombardment by electrons emitted from the photocathode and by the action of the scanning there is a net flow of charge thru the target. This charge flow causes certain physicochemical and electrolytic changes to take place on the glass target material. These gradually increase the susceptibility of the tube to target burn.

To minimize the effects of "burning" or "sticking" the electron image is cyclically displaced on the target 7. To this end a magnetic field is produced by passing a cyclically varying current through the coils of an orbiting yoke 19. The coils of the orbiting yoke are positioned to set up a magnetic field which is substantially perpendicular to the axis of the image orthicon tube 2. This magnetic field tends to alter the path of the photoelectrons from the photocathode 3 in the path toward the target 7. The varying current through the coils of the yoke 19 imparts a motion to the magnetic field and hence to the electron image formed at the target 7, and it has been found that this motion minimizes the effects of burn even though a high contact stationary image is focused on the photocathode. As mentioned above, this slight orbiting movement of the electron image to prevent target "burn" is objectionable for certain television purposes such as where one camera produces a picture which is to be superimposed over a picture from another camera. To compensate for this motion and produce a resultant image which appears to be immobile, a second magnetic field is produced by a current through the coils in a second orbiting yoke 20, which is also perpendicular to the axis of the image orthicon tube 2. This magnetic field tends to alter the path of the scanning beam from the cathode 13 in its path toward the target 7. By varying the current through the coils of the yoke 20, a motion may be imparted to the raster formed by the scanning of the electron beam which is complementary to the motion of the electron image on the target 7 so that the electron image is fixed relative to the scanning raster. In other words, since the electrons in the image section travel in the opposite direction to the electrons in the scanning section the magnetic fields in these two sections must be in the opposite direction.

While one coil might be used in the yokes 19 and 20 to displace the electron image to advantage, it has been found desirable to employ more than one coil placed radially around the image section of the image orthicon. As shown in Figure 1, the orbiting yoke 19 may be identical in construction to the orbiting yoke 20, and accordingly only the yoke 20 is shown in the diagrammatic view of Figure 2. If desired however, these yokes may be constructed to account for different distances from the axis of the tube etc. in manners known to the art. The orbiting yoke 20 includes four coils 21, 22, 23, and 25 toroidally wound on a thin cylindrical core 26 of mu-metal or any other suitable material. The four coils are equally spaced (90 degrees apart) on the core 26 circumference, and opposite sectors are properly connected so that the coil pairs will produce quadrature fields substantially perpendicular to the cylinder axis when excited by current from a suitable source. The length of the core 26 selected to be approximately the distance from the photocathode to the target of the image orthicon with which it is used, and the inside diameter thereof is such that it can be fitted directly over the focus coil. Alternatively, if desired, the orbiting yokes 19 and 20 which are relatively thin could be designed to fit between the focus coil 9 and the tube 2, or deflection coils 15.

It is the usual practice to cover the entire length of the focus coil with a thin sheet of magnetic material 18 for magnetic shielding purposes to prevent an external magnetic field from entering the image tube and deteriorating the image quality. If the orbiting yokes 19 and 20 are placed externally over the focus coil 9, it is obvious that this portion of the shield 18 must be cut away. However, the cores of the toroidal orbit yokes 19 and 20 will also serve the function of providing continuity of focus coil shielding.

Figures 2, 3:
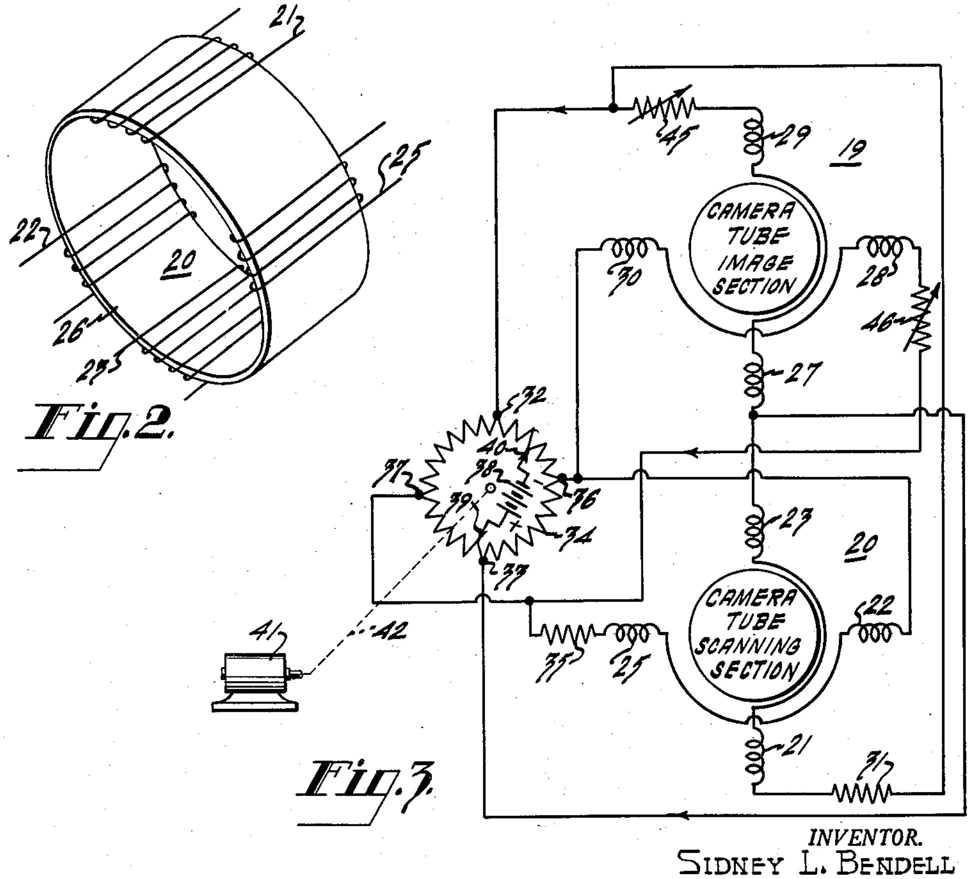
Figure 2 is a perspective view schematically illustrating one of the orbiting coil sections used with the image orthicon tube of Figure 1.
Figure 3 is a schematic circuit diagram of the connections for the orbiting coils in accordance with the present invention.

As mentioned above, the orbiting yoke 19 is of the same construction as the yoke 20, and includes four coils 27, 28, 29 and 30. The coils of the orbiting yokes 19 and 20 may be connected with a current supply means as shown in Figure 3. The coils 21 and 23 are connected in series so that the respective magnetic fields are in opposite directions in the core 26, and the series combination is connected through a current limiting resistor 31, the taps 32 and 33 on a potentiometer 34. In like manner, the coils 22 and 25 are connected in series and through a current limiting resistor 35 to the taps 36 and 37 on the potentiometer 34. A source of potential which is shown as a battery 38 is connected between two slidable contacts 39 and 40 on the potentiometer 34, and the contacts are adapted to be rotated by means of a slow speed motor 41 which makes one revolution per minute, for example. The motor is mechanically linked to the slidable contacts by some suitable means shown by the dashed line 42.

In like manner, the coils 27 and 29 are connected between the taps 32 and 33 on the potentiometer 34 through a variable resistor 45, and the coils 28 and 30 are connected between the taps 36 and 37 through a variable resistor 46. Thus it can be seen that the corresponding coils 21—23 and 27—29 of the orbiting yokes 19 and 20 respectively are connected in parallel with the energizing current supply terminals 32 and 33 similar currents are passed through these coils. As shown in Figure 3, the current through the coils of the yoke 19 are in the opposite direction to the current in the yoke 20 so that the respective magnetic fields will be in the opposite direction. This is necessary so that the image electrons, and beam electrons which travel in opposite directions will be displaced in the same direction. The magnitude of the orbiting of the electron image may be adjusted to correspond to that of the scanning raster by adjustment of the variable resistors 45 and 46 respectively. In this manner, the electron image remains fixed relative to the scanning raster so that the resultant output signal from the image orthicon tube is unaffected by the orbiting while at the same time the effects of "burning" or "sticking" are materially reduced.

Rotation of the contacts 39 and 40 of the potentiometer 31 will result in a circular motion being imparted to the electron image and the scanning raster on the target 7. While a potentiometer having rotating slidable contacts thereon has been illustrated as a means for varying current through the coils of the yokes 19 and 20 in the illustrative embodiment, it will be apparent that the means for varying the current through the various coils is not limited to such apparatus. Nor is the invention related to any specific number of coils.

The rotation of the slidable contacts 39 and 41 by the motor 43 is at a very low rate such as for example one revolution per minute. The magnetic field within the image section of the image orthicon correspondingly rotates the rate of one revolution per minute, causing the image on the target electrode 7 to cyclically orbit about a circular path.

Figure 4:
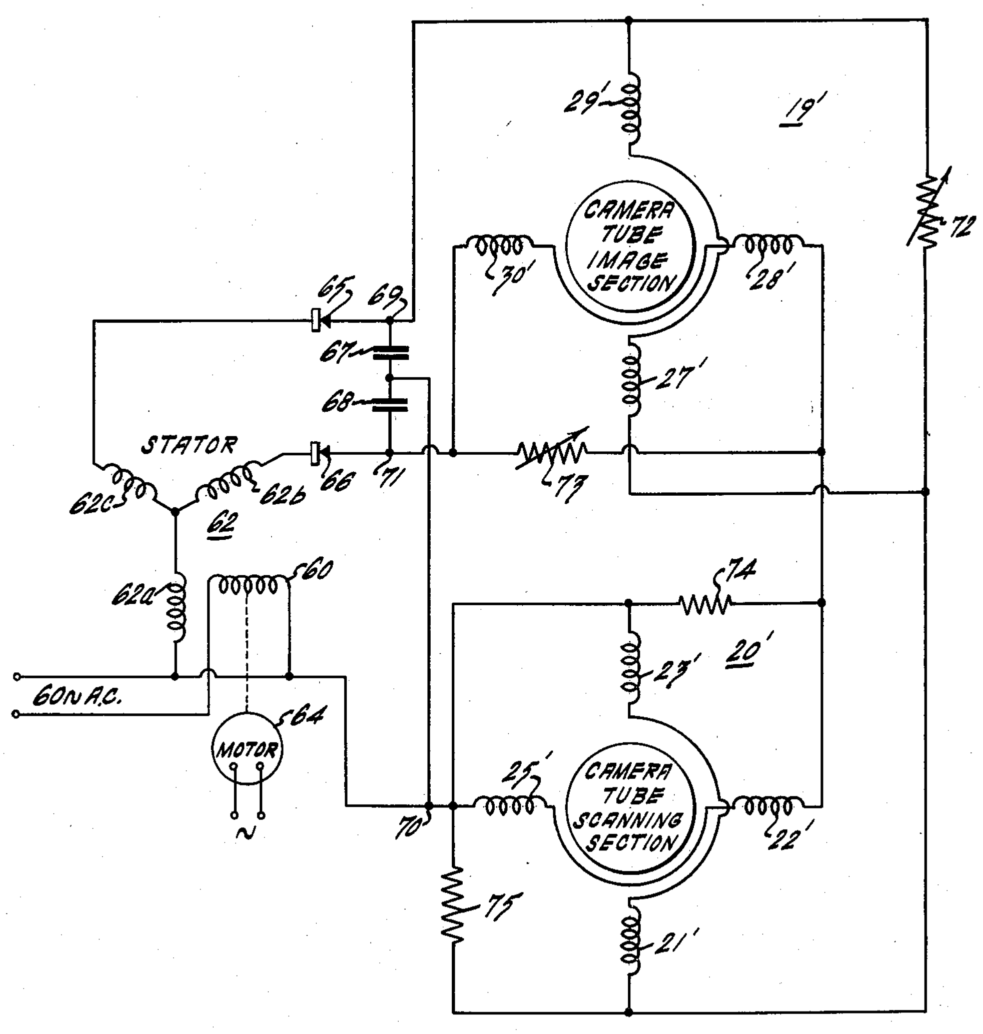
Figure 4 is a schematic circuit diagram illustrating a modification of the connections for the orbiting coils.

A modification of the circuit connections and current supply means for the various coils in the orbiting yokes 19 and 20 is shown in Figure 4. The current supply means includes a servo generator having a rotor winding 60 and stator winding. The rotor winding 60 is driven by a low speed motor 64. By way of example the motor 64 may provide one revolution per minute. The rotor for the servo generator is connected with an alternating current voltage source which may conveniently be obtained from the 60 cycle A.C. mains. The three stator windings 62a, 62b and 62c are physically located 120° apart as shown in the drawing. The amplitude of the 60 cycle voltage appearing on each of the stator windings is proportional to the shaft angle of the rotor winding. As the shaft is turned at a constant speed, such as 1 r.p.m., three amplitude-modulated 60 cycle signals will be developed across the three stator windings. The phase angle of the one cycle per minute modulating components will be 120° between windings. In a sense the 60 cycles may be thought of as a carrier wave and the 1 r.p.m. drive as a modulating signal. Only two of the stator output signals are required. The selected output signals are appropriately rectified by the rectifiers 65 and 66 and filtered by the capacitors 67 and 68. Normally the stator signal is a 60 cycle signal modulated by a 1 r.p.m. shaft rotation. However, this amounts to a suppressed carrier type modulation. To rectify the signal properly and thus obtain a true 1 r.p.m. sine wave, the carrier must be reinserted. This is done by connecting one of the stator windings 62a to a source of alternating current which is conveniently provided at the rotor winding 60.

The outputs of the rectifiers are 1 r.p.m. currents whose amplitudes are sufficient to drive the quadrature yoke 19′ and 20′ windings directly. The 2 r.p.m. signals are 120° apart instead of the 90° required for purely circular orbiting. This produces a slight elliptical path which, however, is completely satisfactory.

The connection of the windings of the orbiting yokes 19 and 20 are also different from those shown in Figure 3. The windings 27′ and 29′ of the image section orbiting yoke 19 are connected in series with the windings 21′ and 23′ of the scanning section orbiting yoke 20, and the series combination is connected across the terminals 69 and 70 of the current supply means. Similarly the windings 30′ and 28′ of the image section orbiting yoke 19 are connected in series with the windings 22′ and 25′ of the yoke 20, and the series combination is connected across the current supply terminals 70 and 71. The current through the windings 29′—27′ is in the opposite direction to that through the windings 21′—23′, and likewise current through the windings 30′—28′ is opposite to that through the windings 22′ and 25′. As mentioned above, this produces magnetic fields of oposite direction in the image and scanning sections of the image orthicon tube to maintain the scanning raster in the same registry with the electron image.

To effect the same amount of orbiting in the image and scanning sections of the tube, a variable resistor 72 is connected in parallel with the coils 29′—27′ to control the amount of current flowing therethrough. A variable resistor 73 also shunts the coils 30′—28′ to control the current through these coils. Fixed resistors 74 and 75 may be provided in parallel with the coils 25′—22′ and 21′—23′ respectively so that the current through the coils in the yoke 19′ may be adjusted to either a greater or lesser magnitude than the current in the coils of the yoke 20′. Naturally if desired, the variable resistors could be connected with the yoke 20′, or alternatively all the resistors could be made variable.

The television camera system described above permits the movement of the electron image on the target electrode of an image orthicon tube to prevent "sticking" or "burning" but compensates for this movement in a manner such that the image represented by the output signal from the camera when reproduced on a receiver or monitor appears to be stationary.

What is claimed is:

1. Apparatus including the combination of an image orthicon camera tube having an image section, and an electron beam scanning section, said image section including a photocathode and a target electrode, said scanning section being located on the opposite side of said target from said photocathode and including an electron gun for producing a beam of electrons directed toward said target, deflection means including coils positioned adjacent the scanning section of said tube to control said electron beam to define a scanning raster on said target electrode, a focusing coil positioned adjacent said image section and scanning section to provide a magnetic field for focusing the electron image from said photocathode and the electron beam from said electron gun on said target electrode, a first orbiting yoke including toroidal windings on a first cylindrical magnetic core positioned around a portion of said focusing coil adjacent the scanning section of said tube, a second orbiting yoke including toroidal windings on a second cylindrical magnetic core positioned around a portion of said focusing coil adjacent the image section of said tube, and magnetic shielding means for said focusing coil to shield said tube from external magnetic fields including said first and second magnetic cores.

2. Apparatus including the combination of an image orthicon camera tube having an image section, and an electron beam scanning section, said image section including a photocathode and a target electrode, said scanning section being located on the opposite side of said target from said photocathode and including an electron gun for producing a beam of electrons directed toward said target, deflection means including coils positioned adjacent the scanning section of said tube to control said electron beam to define a scanning raster on said target electrode, a focusing coil positioned adjacent said image section and scanning section to provide a magnetic field for focusing the electron image from said photocathode and the electron beam from said electron gun on said target electrode, a pair of orbiting yokes each including a plurality of toroidal windings equally spaced about the circumference of a cylindrical magnetic core, one of said orbiting yokes being positioned adjacent the scanning section of said tube and the other of said yokes positioned adjacent the image section of said tube, means providing a source of cyclically varying current connected with the coils of the yoke adjacent said image section to provide a magnetic field within said image section orbiting in a first direction and connected with the coils of the orbiting yokes adjacent the scanning section to produce a magnetic field orbiting within said scanning section in a direction opposite to said first section whereby the image and the scanning raster are orbited in the same direction to maintain a predetermined positioning of said raster relative to said electron image on said target electrode.

3. Apparatus including the combination of an image orthicon camera tube having an image section, and an electron beam scanning section, said image section including a photocathode and a target electrode, said scanning section being located on the opposite side of said target from said photocathode and including an electron gun for producing a beam of electrons directed toward said target, deflection means including coils positioned adjacent the scanning section of said tube to control said electron beam to define a scanning raster on said target electrode, a focusing coil positioned adjacent said image section and scanning section to provide a magnetic field for focusing the electron image from said photocathode and the electron beam from said electron gun on said target electrode, a first orbiting yoke comprising magnetic core means positioned to surround a portion of said focusing coil adjacent the scanning section of said tube, a plurality of windings spaced circumferentially and progressively around said first magnetic core means, means connecting progressively alternate coils in series so that the respective magnetic fields are in opposite directions in said core, a second orbiting yoke comprising a second magnetic core means positioned to surround a portion of said focusing coil adjacent the image section of said tube, a plurality of windings spaced circumferentially and progressively around said second magnetic core means, means connecting progressively alternate coils around said second core means in series so that the respective magnetic fields are in opposite directions in said second core means, and magnetic shielding means for said focusing coil to shield said tube from external magnetic fields including said first and second magnetic cores.

4. Apparatus including the combination of an image orthicon camera tube having an image section, and an electron beam scanning section, said image section including a photocathode and a target electrode, said scanning section being located on the opposite side of said target from said photocathode and including an electron gun for producing a beam of electrons directed toward said target, deflection means including coils positioned adjacent the scanning section of said tube to control said electron beam to define a scanning raster on said target electrode, a focusing coil positioned adjacent said image section and scanning section to provide a magnetic field for focusing the electron image from said photocathode and the electron beam from said electron gun on said target electrode, a pair of orbiting yokes each including magnetic core means, a plurality of windings spaced circumferentially and progressively around said core means, one of said orbiting yokes being positioned to surround the scanning section of said tube and the other of said yokes positioned to surround the image section of said tube, means providing a source of cyclically varying current connected with the coils of the yoke surrounding said image section to provide a magnetic field within said image section orbiting in a first direction and connected with the coils of the orbiting yokes surrounding said scanning section to produce a magnetic field orbiting within said scanning section in a direction opposite to said first section whereby the image and the scanning raster are orbited in the same direction to maintain a predetermined positioning of said raster relative to said electron image on said target electrode.

5. Apparatus including the combination of an image orthicon camera tube including an image section, and a scanning section, said image section having a photocathode and a target, said photocathode adapted to provide an electron image on said target, said scanning section including an electron gun for producing a beam of electrons directed toward said target, deflection means adapted to provide a scanning raster on said target, a focusing coil surrounding said image section, said scanning section and said deflection means to provide a magnetic field for focusing the electron image from said photocathode and the electron beam from said electron gun on said target electrode, a pair of yokes each including a cylindrical magnetic core and a plurality of coils mounted radially around the axis of said image orthicon camera tube, one yoke positioned adjacent said image section to surround said focusing coil and the other yoke positioned adjacent the scanning section of said image orthicon camera tube to surround said focusing coil, current varying means connected to said plurality of coils adjacent said image section whereby the electron image on the target of said image orthicon camera tube may be cyclically displaced and also connected to the plurality of coils adjacent said scanning section whereby the scanning raster on the target of said image orthicon camera tube may be cyclically displaced in the same direction, and a shield of magnetic material surrounding said focusing coil, said shield being coaxial with said cylindrical magnetic cores and extending from said core positioned adjacent the scanning section of said tube axially toward said electron gun.

References Cited in the file of this patent

UNITED STATES PATENTS

| | | |
|---|---|---|
| 2,632,864 | Hunter | Mar. 24, 1953 |
| 2,881,248 | Wilner | Apr. 7, 1959 |